United States Patent
Nochi et al.

(10) Patent No.: US 8,124,021 B2
(45) Date of Patent: Feb. 28, 2012

(54) EXHAUST GAS TREATMENT SYSTEM

(75) Inventors: Katsumi Nochi, Hiroshima-ken (JP); Masanao Yonemura, Hiroshima-ken (JP); Yoshiaki Obayashi, Hiroshima-ken (JP); Hitoshi Nakamura, Nagasaki-ken (JP); Toshio Koyanagi, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 910 days.

(21) Appl. No.: 11/705,601

(22) Filed: Feb. 13, 2007

(65) Prior Publication Data

US 2007/0217968 A1    Sep. 20, 2007

(30) Foreign Application Priority Data

Mar. 1, 2006   (JP) ................. 2006-054811

(51) Int. Cl.
*B01D 50/00*   (2006.01)
(52) U.S. Cl. ............................................. 422/177
(58) Field of Classification Search .......... 422/168, 422/177, 180; 502/305, 309, 350
See application file for complete search history.

(56) References Cited

U.S. PATENT DOCUMENTS

| | | | |
|---|---|---|---|
| 4,977,127 A * | 12/1990 | Rikimaru et al. ............. | 502/309 |
| 5,120,695 A * | 6/1992 | Blumrich et al. ............. | 502/78 |
| 5,232,889 A | 8/1993 | Blanchard et al. | |
| 5,352,646 A | 10/1994 | Blanchard et al. | |
| 2002/0025905 A1 * | 2/2002 | Harris et al. ................. | 502/309 |

FOREIGN PATENT DOCUMENTS

| | | |
|---|---|---|
| JP | 48-027990 A | 4/1973 |
| JP | 62-065721 A | 3/1987 |
| JP | 2651998 B2 | 9/1997 |
| JP | 10-309462 A | 11/1998 |
| JP | 2000-070676 A | 3/2000 |
| JP | 2001-149758 A | 6/2001 |
| JP | 2005-081183 A | 3/2005 |

OTHER PUBLICATIONS

Japanese Offfice Action dated Nov. 19, 2010, issued in corresponding Japanese Patent Application No. 2006-054811.
Japanese Office Action dated Nov. 15, 2011, issued in corresponding Japanese Patent Application No. 2006-054811. X.

* cited by examiner

*Primary Examiner* — Tom Duong
(74) *Attorney, Agent, or Firm* — Westerman, Hattori, Daniels & Adrian, LLP

(57) ABSTRACT

It is intended to provide an exhaust gas treatment system, which allows for VOC removal at lower temperatures and thereby improves the durability of catalysts and suppresses carbon monoxide generation at the final outlet of the system. The present invention provides a treatment system of an exhaust gas containing a nitrogen oxide, carbon monoxide, and a volatile organic compound comprising: an exhaust gas treatment means for removing the nitrogen oxide by reduction with ammonia and partially oxidizing the VOC to CO; and a CO/VOC removal means for oxidizing the CO and partially unreacted VOC, in this order from the upstream flow of the exhaust gas.

16 Claims, No Drawings

EXHAUST GAS TREATMENT SYSTEM

BACKGROUND OF THE INVENTION

1. Field of the Invention

The present invention relates to an exhaust gas treatment system.

2. Description of the Related Art

NOx, SOx, carbon monoxide (CO), and volatile organic compounds (VOCs) such as saturated hydrocarbons except methane and ethane and unsaturated hydrocarbons e.g. ethylene are contained in exhaust gases discharged from industrial devices of various types (e.g. automobile engines, air craft gas turbines, and gas turbines for power generation), chemical plants, factories of various types, and so on. Such components contained in exhaust gases have been treated by adopting a system using catalysts for the removal of CO, VOCs and the like in combination with a denitration catalyst.

The current system requires the catalysts for the removal of CO, VOCs and the like at an upstream stage with a higher temperature because the catalysts have to be exposed to a temperature higher than 400° C. for improving the conversion rates of CO and VOC (see e.g., Japanese Patent Provisional Publication No. 10-309462). However, the system operation under the high temperature presents problems in terms of the durability of the apparatus such as the deterioration of the catalysts for the removal of CO, VOCs and the like.

Among VOCs, particularly, saturated hydrocarbons (NMHCs) such as propane shows a low burning velocity in the presence of the catalysts for the removal of CO, VOCs and the like conventionally placed at the upstream stage. Most of the saturated hydrocarbons passed through the upstream stage remaining unreacted unless the temperature is increased to 550° C. which is the upper limit of the suitable temperature range described in Japanese Patent Provisional Publication No. 10-309462. As a result, the saturated hydrocarbons unreacted are partially oxidized with the denitration catalyst placed downstream at 400° C. or lower and become a source of carbon monoxide at the final outlet of the system.

An object of the present invention is to provide an exhaust gas treatment system, which allows for VOC removal at lower temperatures and thereby improves the durability of catalysts and suppresses carbon monoxide generation at the final outlet of the system.

SUMMARY OF THE INVENTION

The present invention has been completed for attaining the object. Specifically, an exhaust gas treatment system according to the present invention may be a treatment system of an exhaust gas containing a nitrogen oxide (NOx), carbon monoxide, and a volatile organic compound for attaining the object comprising: exhaust gas treatment means for removing the nitrogen oxide by reduction with ammonia ($NH_3$) and partially oxidizing the volatile organic compound (VOC) to carbon monoxide (CO); and CO/VOC removal means for oxidizing the CO and partially unreacted VOC, in this order from the upstream side of a gas flow.

It may be preferred that the exhaust gas treatment system according to the present invention further comprises secondary reductive denitration means downstream of the CO/VOC removal means.

An exhaust gas treatment system according to the present invention may be a treatment system of an exhaust gas containing carbon monoxide and a volatile organic compound comprising: exhaust gas treatment means for partially oxidizing the VOC to CO; and CO/VOC removal means for oxidizing the CO and partially unreacted VOC, in this order from an upstream flow of the exhaust gas.

For the exhaust gas treatment system according to the present invention, it is preferred that the exhaust gas treatment means comprise an exhaust gas treating catalyst comprising 60% or more by weight $TiO_2$, 0 to 8% by weight $V_2O_5$, and 3 to 20% by weight $WO_3$ with respect to the total weight thereof.

For the exhaust gas treatment system according to the present invention, it may be preferred that the CO/VOC removal means comprise a CO/VOC removal catalyst in which a porous inorganic compound layer comprising a noble metal and having reactivity to the CO and VOC is formed on a honeycomb substrate made of a porous inorganic compound unreactive to the nitrogen oxide, CO, and VOC.

For the exhaust gas treatment system according to the present invention, it is preferred that the CO/VOC removal means comprises a CO/VOC removal catalyst in which a porous inorganic compound layer comprising a noble metal is formed on a honeycomb substrate comprising an NMHC oxidation catalyst.

For the exhaust gas treatment system according to the present invention, it is preferred that the CO/VOC removal means comprise a CO/VOC removal catalyst in which a porous inorganic compound layer comprising a noble metal and in which an NMHC oxidation catalyst is formed on a honeycomb substrate comprising an NMHC oxidation catalyst.

For the exhaust gas treatment system according to the present invention, it is preferred that the porous inorganic compound layer have a thickness of 4 μm to 80 μm.

For the exhaust gas treatment system according to the present invention, it is preferred that the noble metal be platinum (Pt), and the Pt have an average particle size of 1 to 15 nm.

For the exhaust gas treatment system according to the present invention, it is preferred that the porous inorganic compound layer have a BET specific surface of 50 $m^2/g$ or more and hold the noble metal within 50 μm deep from the surface thereof.

For the exhaust gas treatment system according to the present invention, it is preferred that the CO/VOC removal means be operated at a temperature of 200 to 400° C.

According to the present invention, an exhaust gas treatment system with excellent durability, which is improved in the conversion rates of carbon monoxide and volatile organic compounds contained in exhaust gases under relatively low temperature conditions, can be obtained.

DETAILED DESCRIPTION OF THE PREFERRED EMBODIMENTS

Hereinafter, the present invention will be described in detail.

An exhaust gas treatment system according to the present invention may be a system for treating an exhaust gas containing NOx, CO and VOC.

The "volatile organic compound" generally refers to hydrocarbons except methane and ethane.

The exhaust gas treatment system of the present invention may be a system comprising exhaust gas treatment means on the upstream side of a gas flow.

The exhaust gas treatment means may be an element responsible for removing the nitrogen oxide by reduction with ammonia as shown in (Formula 1) and partially oxidizing the VOC to CO as shown in (Formula 2) in the exhaust gas treatment system.

$$4NO + 4NH_3 + O_2 \rightarrow 4N_2 + 6H_2O \quad \text{(Formula 1)}$$

$$C_mH_n + (2m+n/4)O_2 \rightarrow mCO + (n/2)H_2O \quad \text{(Formula 2)}$$

The reducing agent for the nitrogen oxide is not limited to ammonia but may include compounds which generate ammonia in the gas phase or in the exhaust gas treatment means. The reducing agent to be used is besides ammonia, for example, urea water ($(NH_2)_2CO$), which generates ammonia through hydrolysis as shown in (Formula 3).

$$(NH_2)_2CO + H_2 \rightarrow 2NH_3 + CO_2 \quad \text{(Formula 3)}$$

Alternatively, the exhaust gas treatment means may be an element responsible for partially oxidizing the VOC to CO in the exhaust gas treatment system. In this case, the exhaust gas treatment means may not employ the function of removing the nitrogen oxide by reduction with ammonia.

The exhaust gas treatment means can comprise an exhaust gas treating catalyst such as a $TiO_2$—$WO_3$ compound or a $TiO_2$—$V_2O_5$—$WO_3$ compound. Besides, the exhaust gas treatment means that can be applied to the present invention may be a catalyst such as a $TiO_2$—$V_2O_5$-molybdenum oxide ($MoO_3$) compound or a $TiO_2$—$V_2O_5$ compound, which is used for removing nitrogen oxides by reduction with ammonia or urea. In the process of developing a technique for removing nitrogen oxides by reduction with ammonia in the presence of the exhaust gas treating catalyst such as a $TiO_2$—$WO_3$ compound or a $TiO_2$—$V_2O_5$—$WO_3$ compound, we have found that the exhaust gas treating catalyst also has a function of partially oxidizing to CO, VOCs including unsaturated hydrocarbon compounds such as $C_2H_4$ and $C_6H_6$ and saturated hydrocarbon compounds such as $C_3H_8$ and $C_4H_{10}$, as shown in, for example, (Formula 4). Depending on a VOC component, both partial oxidation and complete oxidation reactions proceed as shown in (Formula 5) and (Formula 6).

$$C_3H_8 + 7/2O_2 \rightarrow 3CO + 4H_2O \quad \text{(Formula 4)}$$

$$C_6H_6 + 9/2O_2 \rightarrow 6CO + 3H_2O \quad \text{(Formula 5)}$$

$$C_6H_6 + 15/2O_2 \rightarrow 6CO_2 + 3H_2O \quad \text{(Formula 6)}$$

Since this function of partial oxidation to CO is independent of the use of the function of removing the nitrogen oxide by reduction with ammonia, the exhaust gas treatment means has become an important element responsible for the function of partially oxidizing the VOC to CO by using the exhaust gas treating catalyst as the exhaust gas treatment means.

Exhaust gases discharged from gas turbines for power generation, chemical plants and so on inevitably contain nitrogen oxides. Under current strict emission control, an exhaust gas treating catalyst which removes nitrogen oxides by reduction with ammonia may be commonly placed in such facilities. CO can be easily oxidized with a CO/VOC removal catalyst at low temperatures. Thus, the partial oxidation to CO and subsequent removal of VOC including poorly combustible saturated hydrocarbons by using the industrially utilized catalyst for exhaust gas treatment in combination with the CO/VOC removal catalyst are exceedingly efficient in terms of cost.

When the exhaust gas treating catalyst comprises the $TiO_2$—$V_2O_5$—$WO_3$ compound, it may be preferred that the exhaust gas treating catalyst has 60% or more by weight $TiO_2$, 0 to 8% by weight $V_2O_5$, and 3 to 20% by weight $WO_3$, with respect to the total weight thereof. In this context, the exhaust gas treating catalyst may have 90% by weight $TiO_2$ as the upper limit.

It may be further preferred that the exhaust gas treating catalyst have a 70% or more by weight $TiO_2$, 3 to 8% by weight $V_2O_5$, and 8 to 20% by weight $WO_3$, with respect to the total weight thereof. The exhaust gas treating catalyst having a larger $V_2O_5$ content can partially oxidize VOC including poorly combustible saturated hydrocarbons to CO to a higher extent. On the other hand, it has been shown in Example 8 below that the exhaust gas treating catalyst having a $WO_3$ content of 20% by weight can partially oxidize the VOC to CO to a sufficient extent even if the exhaust gas treating catalyst has 0% by weight $V_2O_5$.

Thus, $V_2O_5$ can be an arbitrary component when the $WO_3$ content ranges from 16 to 20% by weight.

The exhaust gas treatment system of the present invention is a system comprising CO/VOC removal means downstream of the exhaust gas treatment means.

The CO/VOC removal means is an element responsible for a function of oxidizing the CO and VOC in the exhaust gas treatment system.

The CO/VOC removal means may include CO/VOC removal means in which a $\gamma$-$Al_2O_3$ layer comprising a noble metal is formed on a cordierite honeycomb substrate conventionally known in the art, CO/VOC removal means in which a $\gamma$-$Al_2O_3$ layer comprising a noble metal is formed on a solid honeycomb substrate mainly comprising $TiO_2$, and CO/VOC removal means in which $\gamma$-$Al_2O_3$ comprising a noble metal and an unburned hydrocarbon oxidation catalyst described later are layered or contained.

For the exhaust gas treatment system of the present invention, it may be preferred that the CO/VOC removal means comprises a noble metal and an unburned hydrocarbon (NMHC) oxidation catalyst.

The noble metal is not particularly limited as long as it can promote the oxidation of CO and unsaturated and saturated hydrocarbons. The noble metal may be preferably at least one member selected from the group consisting of, for example, Ir, Rh, Ru, Pt, Pd, Ag, Au, and oxides thereof, and may be more preferably Pt, Pd, or Ru, even more preferably Pt.

The noble metal may be prepared first as an aqueous solution of a noble metal salt comprising a nitrate, chloride, acetate, or complex salt dissolved therein. The noble metal salt aqueous solution may contain a pH buffer solution for stabilizing the rate of metal ion reduction during the colloid production described hereinafter.

A metal colloid solution containing the noble metal can be obtained by adding the noble metal salt aqueous solution to a mixture comprising a reducing agent (which includes: organic acids such as sodium citrate, potassium citrate, acetic acid, formic acid, and malic acid; alcohols such as methanol, ethanol, and propanol; and ethers such as diethyl ether), water, and a polymer material such as polyvinyl alcohol, polyvinylpyrrolidone, or polymethylvinyl ether and heating the resulting mixture solution to about 80 to about 95° C.

The average particle size of the Pt colloid contained in the colloid solution may be preferably 1 to 15 nm. The upper limit of the average particle size may be more preferably 3 nm. In the present specification, the average colloid particle size can be measured with a TEM photograph.

In the present specification, the NMHC oxidation catalyst is an oxidation catalyst that can oxidize unburned saturated hydrocarbons to at least carbon monoxide.

The NMHC oxidation catalyst can be made of, for example, the $TiO_2$—$V_2O_5$—$WO_3$ compound or $TiO_2$—$WO_3$ compound as the exhaust gas treating catalyst, which may be used in a selective catalytic reduction (SCR) method of NOx such as denitration with ammonia or urea.

The CO/VOC removal means can be obtained as a CO/VOC removal catalyst, for example, by allowing the noble metal-containing colloid solution to be carried by a porous inorganic compound, converted into slurry, and layered onto a honeycomb substrate comprising an NMHC oxidation catalyst.

The porous inorganic compound which constitutes the carrier may be preferably at least one selected from the group consisting of $SiO_2$, $Al_2O_3$, $TiO_2$, $ZrO_2$, $SiO_2$—$Al_2O_3$, $TiO_2$—$SiO_2$, $TiO_2$—$Al_2O_3$, $TiO_2$—$ZrO_2$, $SO_4/ZrO_2$, $SO_4/TiO_2$, $SO_4/TiO_2$—$ZrO_2$, metallosilicate, and zeolites such as β-zeolite.

The conversion to slurry can be performed, for example, by allowing the noble metal-containing colloid solution to be carried by the porous inorganic compound by a spray-drying method, sintered, and then pulverized with a ball mill.

The concentration of the slurry obtained by the above conversion method may be preferably 5% to 20% by weight, more preferably 10% to 15% by weight. The concentration of the slurry can be obtained by measuring the weight of the dried slurry.

The CO/VOC removal catalyst can be obtained, for example, by wash-coating the slurry onto a honeycomb substrate comprising an NMHC oxidation catalyst.

The thickness of the porous inorganic compound layer formed by wash-coating can be 4 μm to 80 μm when the slurry has the concentration described above. The thickness of the porous inorganic compound layer may have a preferred lower limit of 10 μm and a preferred upper limit of 20 μm. The thickness of the porous inorganic compound layer can be measured with an SEM photograph or EPMA analysis.

The obtained CO/VOC removal catalyst can have a Pt content of 0.39 g/L to 0.59 g/L (Pt Weight/Total Volume of Catalyst). The Pt content may be preferably not more than 0.53 g/L.

Alternatively, the CO/VOC removal means can be obtained as a CO/VOC removal catalyst comprises a honeycomb substrate and a porous inorganic compound layer thereon wherein the substrate comprises an NMHC oxidation catalyst and the layer comprises a noble metal and an NMHC oxidation catalyst.

The porous inorganic compound layer comprising a noble metal and an NMHC oxidation catalyst is generally formed by mixing a slurry containing a noble metal with a slurry containing an NMHC oxidation catalyst to form a mixture, wherein the slurry containing the noble metal is obtained by allowing a colloid solution containing a noble metal to be carried on a carrier; sintering the mixture; and pulverizing the sintered mixture with a ball mill.

The CO/VOC removal means can also be obtained as a CO/VOC removal catalyst in which a porous inorganic compound layer comprising a noble metal and having reactivity to the CO and VOC is formed on a honeycomb substrate made of a porous inorganic compound unreactive to the nitrogen oxide, CO, and VOC.

It may be preferred that the noble metal contained in the porous inorganic compound layer is Pt having an average particle size of 1 to 15 nm. The Pt may have an average particle size of 2 nm as the more preferred lower limit and 11 nm as the more preferred upper limit.

The average particle size of the Pt may be determined by calculating the distribution of Pt particles by a chemical adsorption method using CO pulses.

The porous inorganic compound layer may preferably have a BET specific surface of 50 $m^2$/g or more. The porous inorganic compound layer may have a BET specific surface of 100 $m^2$/g as the more preferred lower limit and 150 $m^2$/g as even more preferred lower limit. The porous inorganic compound layer can have a BET specific surface of, for example, 300 $m^2$/g as the preferred upper limit as long as the BET specific surface falls within the range described above. The porous inorganic compound having the reactivity can be a porous inorganic compound that has a specific surface of 50 $m^2$/g or more and can bring out the reactivity of a noble metal by allowing the noble metal to be carried in a highly dispersed manner on the porous inorganic compound.

In the present specification, the BET specific surface can be measured by using a nitrogen adsorption method.

The porous inorganic compound layer may preferably have a BET specific surface of 50 $m^2$/g or more as described above and preferably hold the noble metal within 50 μm deep from the surface thereof.

It may be preferred that 50% or more by weight of the amount of the noble metal carried on the porous inorganic compound layer is contained within 30 μm deep, more preferably 10 μm deep from the surface of the porous inorganic compound layer.

Among VOCs, particularly, saturated hydrocarbons such as propane showed a low burning velocity on the conventional catalysts for the removal of CO, VOC and the like so that the saturated hydrocarbons mostly passed therethrough in unreacted forms. As a result, the saturated hydrocarbons can be partially oxidized with a denitration catalyst placed downstream and can become a source of carbon monoxide.

When the exhaust gas treatment system of the present invention comprises the CO/VOC removal catalyst having the structure as described above, the exhaust gas treatment system can perform both the conversion of saturated hydrocarbons typified by propane to CO by combustion and the oxidation of the CO. As a result, the exhaust gas treatment system can promote the complete combustion of the saturated hydrocarbons to $CO_2$ on the whole and drastically reduce not only the amount of CO discharged at the downstream outlet but also the amount of VOC discharged.

Saturated hydrocarbons are not completely incombustible in the conventional catalysts for the removal of CO, VOC and the like. Therefore, it is not impossible to burn the saturated hydrocarbons such as propane if the amount of the catalysts is increased. However, it is obvious that such a case is not realistic because of huge cost of the catalysts attributed to the use of expensive Pt. On the other hand, the exhaust gas treating catalyst comprising the $TiO_2$—$V_2O_5$—$WO_3$ compound is composed of only base metals and is therefore quite inexpensive. Furthermore, exhaust gases discharged from automobile engines, gas turbines for power generation, chemical plants, and so on inevitably contain nitrogen oxides. Under current strict emission control, an exhaust gas treating catalyst which removes nitrogen oxides by reduction with ammonia is commonly placed in such facilities. Thus, the removal of VOC including poorly combustible saturated hydrocarbons by using the exhaust gas treating catalyst is exceedingly efficient.

Preferably, the CO/VOC removal means of the exhaust gas treatment system of the present invention may be usually operated at a temperature of 200° C. to 400° C. from the viewpoint of a balance between catalyst activity and the maintenance of the durability of the apparatus. The CO/VOC removal means may be operated at a temperature of 300° C. as the more preferred lower limit.

The exhaust gas treatment system of the present invention can remove, for example, 65% or more, 70% or more, or 73% or more of propane simultaneously with 70% or more, 98% or more, or 99% or more of CO, at 400° C.

The exhaust gas treatment system of the present invention has a sufficiently high conversion rate even under relatively low temperature conditions, as described above, and can further improve the conversion rate at higher temperatures.

The exhaust gas treatment system of the present invention can be operated under relatively low temperature conditions by placing the CO/VOC removal means downstream of the exhaust gas treatment means, as described above. As a result, the exhaust gas treatment system can improve the durability of the apparatus and so on more than before and can exceedingly reduce CO generation at the final outlet of the system.

It may be preferred that the exhaust gas treatment system of the present invention further comprises secondary reductive denitration means downstream of the CO/VOC removal means.

The secondary reductive denitration means may be placed to remove NOx generated from unreacted ammonia for nitrogen oxide reduction, which has been discharged from the exhaust gas treatment means and oxidized in the CO/VOC removal means placed downstream.

The secondary reductive denitration means is distinguished from the exhaust gas treatment means of the exhaust gas treatment system of the present invention because the secondary reductive denitration means does not require a function of removing CO. However, the secondary reductive denitration means can use the same catalyst as the exhaust gas treating catalyst described above.

EXAMPLES

Hereinafter, the present invention will be described with reference to Examples. However, the present invention is not intended to be limited to them.

Preparation Example 1

A $TiO_2$—$V_2O_5$—$WO_3$ catalyst ($TiO_2$:$V_2O_5$:$WO_3$=80:3:8 by weight) used as an exhaust gas treating catalyst was prepared as follows: ammonia water having an $NH_3$ content of 25% was added to 3600 g of metatitanic acid slurry ($TiO_2$ content of 30% by weight) to adjust pH to 6.5. A powder of ammonium paratungstate was added thereto at 8% by weight in terms of $WO_3$ and kneaded in a wet process for 2 hours. The mixture was then dried and further sintered at 550° C. for 5 hours to obtain a powder of titanium oxide and tungsten oxide. An aqueous solution of ammonium metavanadate was added at 3% by weight in terms of $V_2O_5$ to this powder and sufficiently mixed. The mixture was then dried and sintered at 450° C. for 4 hours to obtain a $TiO_2$—$V_2O_5$—$WO_3$ powder (A). In a kneader, 1000 g of the powder (A), 25 g of carboxymethylcellulose, and 12.5 g of polyethylene oxide were placed and kneaded for 30 minutes after the addition of an appropriate amount of water. The kneaded mixture was then extrusion-molded so that the molded form has a cross-section size of 50 mm×50 mm perpendicular to a gas flow, then dried, and sintered at 500° C. for 5 hours.

Preparation Example 2

A $TiO_2$—$WO_3$ catalyst ($TiO_2$:$WO_3$=75:20 by weight) used as an exhaust gas treating catalyst was prepared as follows: ammonia water having an $NH_3$ content of 25% was added to 3600 g of metatitanic acid slurry ($TiO_2$ content of 30% by weight) to adjust pH to 6.5. A powder of ammonium paratungstate was added thereto at 20% by weight in terms of $WO_3$ and kneaded in a wet process for 2 hours. The mixture was then dried and further sintered at 550° C. for 5 hours to obtain a $TiO_2$—$WO_3$ powder (B). In a kneader, 1000 g of the powder (B), 25 g of carboxymethylcellulose, and 12.5 g of polyethylene oxide were placed and kneaded for 30 minutes after the addition of an appropriate amount of water. The kneaded mixture was extrusion-molded so that the molded form has a cross-section size of 50 mm×50 mm perpendicular to a gas flow, then dried, and sintered at 500° C. for 5 hours.

Preparation Example 3

(I) Preparation of Pt Colloid Solution

A metal colloid solution containing a single noble metal Pt was prepared to perform Examples 4 to 8 and Comparative Example 2. The metal colloid solution was prepared according to the following procedures:

(1) Ion-exchange water and ethanol as a reducing agent were prepared. The ratio of ion-exchange water/reducing agent by volume was 1/1;

(2) 1.5 Litter of the reducing agent (reducing agent solution) was mixed with 1.5 Litter of the ion-exchange water to make 1 Litter of a mixture solution. Moreover, 32 g of polyvinyl alcohol as a polymer material was added thereto. The aqueous solution was kept at 80° C. and boiled for 1 hour to thereby remove dissolved oxygen;

(3) 0.1 Litter of a metal salt corresponding to each active metal was added to the mixture solution to prepare a Pt-containing aqueous solution in which 75 mmol active metal was contained; and (4) The Pt-containing aqueous solution was kept at 80° C. and reduced for 5 hours to thereby obtain 0.5% by weight of a Pt colloid solution (average colloid particle size of 2 to 3 nm).

(II) Production of Catalyst for CO/VOC Removal using Pt Colloid Solution

A $\gamma$-$Al_2O_3$ carrier having a BET specific surface of 113 $m^2$/g was pulverized with a ball mill. The obtained slurry (concentration of 10% by weight) was then layered on a cordierite honeycomb substrate so that the amount of the slurry coated was 42.5 to 57.5 g/$m^2$ with respect to the surface area of the honeycomb substrate. Then, 4000 cc of an aqueous solution containing 0.07% by weight of the Pt colloid with respect to the whole weight of the aqueous solution was prepared. A predetermined amount of Pt was carried on the honeycomb substrate (50 mm long×50 mm wide×50 mm high) by dipping the honeycomb substrate in the aqueous solution for 30 minutes. The catalyst after coating was dried at 110° C. and then sintered at 500° C. for 5 hours to obtain a CO/VOC removal catalyst (1). The coating layer thickness of the obtained catalyst for CO/VOC removal fell in the range of 30 to 80 μm due to the uneven layering of the slurry. When the Pt colloid is carried on the $\gamma$-$Al_2O_3$, the holding conditions depend on the concentration of the polymer material. Since the uneven distribution of the Pt colloid due to the concentration of the polymer material was apparently observed, the evenly colored catalyst was subjected to a reaction rate evaluation test described later.

The Pt particle size after sintering was determined by calculating the degree of Pt dispersion by a chemical adsorption method using CO pulses.

Preparation Example 4

A spray-drying method was used to allow 8800 g of the noble metal-containing colloid solution to be carried on 1500 g of a $\gamma$-$Al_2O_3$ carrier having a BET specific surface of 113 $m^2$/g. The carrier was sintered at 500° C. for 5 hours and further pulverized with a ball mill at 100 rpm for 8 hours to obtain slurry (concentration of 10% by weight). The obtained slurry was layered on a honeycomb substrate comprising an NMHC oxidation catalyst so that the amount of the slurry coated was 8.5 to 11.5 g/m² with respect to the surface area of the honeycomb substrate. The catalyst after coating was dried at 110° C. and then sintered at 500° C. for 5 hours to obtain a CO/VOC removal catalyst (2). The coating layer thickness of the obtained catalyst for CO/VOC removal fell in the range of 4 to 20 μm due to the uneven layering of the slurry.

Preparation Example 5

A spray-drying method was used to allow 8800 g of the noble metal-containing colloid solution to be carried on 1500 g of a γ-Al$_2$O$_3$ carrier having a BET specific surface of 113 m²/g. The carrier was sintered at 500° C. for 5 hours and further pulverized with a ball mill at 100 rpm for 8 hours. The obtained slurry was mixed at a 7:3 ratio by weight with slurry obtained by pulverizing an NMHC oxidation catalyst with a ball mill at 100 rpm for 8 hours, to obtain mixture slurry (concentration of 10% by weight). The obtained mixture slurry was layered on a honeycomb substrate comprising an NMHC oxidation catalyst so that the amount of the slurry coated was 11.9 to 16.1 g/m² with respect to the surface area of the honeycomb substrate. The catalyst after coating was dried at 110° C. and then sintered at 500° C. for 5 hours to obtain a CO/VOC removal catalyst (3). The coating layer thickness of the obtained catalyst for CO/VOC removal fell in the range of 6 to 30 μm due to the uneven layering of the slurry.

Example 1

The exhaust gas treating catalyst obtained in Preparation Example 1 was subjected to an oxidation reaction test of VOC (CH$_4$, C$_2$H$_6$, C$_3$H$_8$, and C$_4$H$_{10}$). In the oxidation reaction test, the hydrocarbon concentrations (shown below) on the upstream side of an exhaust gas flow from kerosene combustion and close behind the exhaust gas treating catalyst were analyzed with an FID gas chromatograph manufactured by Shimadzu Corp. The results are shown in Table 1.

Linear flow rate: 2.0 Nm/s, CO: 9400 ppm, CH$_4$: 8450 ppm, C$_2$H$_6$: 650 ppm, C$_3$H$_8$: 260 ppm, C$_4$H$_{10}$: 190 ppm, O$_2$: 10%, NOx, CO$_2$, H$_2$O, and N$_2$: uncontrolled, space velocity (GHSV) of catalyst for exhaust gas treatment: 7,500 h$^{-1}$, operation temperature: 200° C., 250° C., 300° C., 350° C., and 400° C.

Example 2

The exhaust gas treating catalyst obtained in Preparation Example 1 was subjected to an oxidation reaction test of VOC (C$_6$H$_6$ and C$_6$H$_{12}$). In the oxidation reaction test, the C$_6$H$_6$ and C$_6$H$_{12}$ concentrations on the upstream side of an exhaust gas flow from kerosene combustion and the C$_6$H$_6$ and C$_6$H$_{12}$ concentrations close behind the exhaust gas treating catalyst were analyzed with an FID gas chromatograph manufactured by Shimadzu Corp. The results are shown in Table 2.

Linear flow rate: 2.0 Nm/s, C$_6$H$_6$: 300 ppm, C$_6$H$_{12}$ (cyclohexane): 700 ppm, O$_2$: 5%, NOx: 1500 ppm, NH$_3$: 1380 ppm, CO$_2$, H$_2$O, and N$_2$: uncontrolled, GHSV of catalyst for exhaust gas treatment: 2,800 h$^{-1}$, operation temperature: 300° C.

TABLE 1

| | Catalyst for exhaust gas treatment (% by weight) | Temperature (° C.) | Concentration at inlet of catalyst for exhaust gas treatment (ppm) | | | | | Concentration at outlet of catalyst for exhaust gas treatment (ppm) | | | | | Reaction rate (%) | | | | |
|---|---|---|---|---|---|---|---|---|---|---|---|---|---|---|---|---|---|
| | | | CO | CH$_4$ | C$_2$H$_6$ | C$_3$H$_8$ | C$_4$H$_{10}$ | CO | CH$_4$ | C$_2$H$_6$ | C$_3$H$_8$ | C$_4$H$_{10}$ | CO | CH$_4$ | C$_2$H$_6$ | C$_3$H$_8$ | C$_4$H$_{10}$ |
| Ex. 1 | TiO2(80) | 400 | 9400 | 8450 | 650 | 260 | 190 | 10860 | 8380 | 530 | 90 | 30 | — | 0.8 | 18.5 | 65.4 | 84.2 |
| | V2O5(3) | 350 | 9400 | 8450 | 650 | 260 | 190 | 10490 | 8450 | 570 | 150 | 40 | — | 0.0 | 12.3 | 42.3 | 78.9 |
| | WO3(8) | 300 | 9400 | 8450 | 650 | 260 | 190 | 10160 | 8450 | 600 | 200 | 70 | — | 0.0 | 7.7 | 23.1 | 63.2 |
| | | 250 | 9400 | 8450 | 650 | 260 | 190 | 9830 | 8450 | 620 | 230 | 120 | — | 0.0 | 4.6 | 11.5 | 36.8 |
| | | 200 | 9400 | 8450 | 650 | 260 | 190 | 9560 | 8450 | 640 | 240 | 170 | — | 0.0 | 1.5 | 7.7 | 10.5 |

Example 1

Exhaust gas → 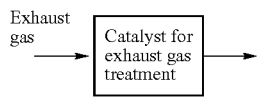 →

TABLE 2

| | Catalyst for exhaust gas treatment (% by weight) | Temperature (° C.) | Concentration at inlet of catalyst for exhaust gas treatment (ppm) | | | Concentration at outlet of catalyst for exhaust gas treatment (ppm) | | | Reaction rate (%) | | |
|---|---|---|---|---|---|---|---|---|---|---|---|
| | | | C$_6$H$_5$ | C$_6$H$_{12}$ | CO | C$_6$H$_5$ | C$_6$H$_{12}$ | CO | C$_6$H$_5$ | C$_6$H$_{12}$ | CO |
| Ex. 2 | TiO2(80) V2O5(3) WO3(8) | 300 | 300 | 700 | 0 | 2.6 | 2.6 | 3080 | 99.1 | 99.6 | — |

TABLE 2-continued

| Catalyst for exhaust gas treatment (% by weight) | Temperature (° C.) | Concentration at inlet of catalyst for exhaust gas treatment (ppm) | | | Concentration at outlet of catalyst for exhaust gas treatment (ppm) | | | Reaction rate (%) | | |
|---|---|---|---|---|---|---|---|---|---|---|
| | | $C_6H_5$ | $C_6H_{12}$ | CO | $C_6H_5$ | $C_6H_{12}$ | CO | $C_6H_5$ | $C_6H_{12}$ | CO |

Example 2

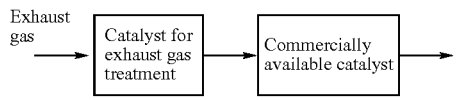

Tables 1 and 2 demonstrated that the VOCs of various kinds are partially oxidized to CO in the zone of the exhaust gas treating catalyst in Examples 1 to 2.

Example 3

A two-stage exhaust gas treatment system of the present invention was obtained by allowing the exhaust gas treating catalyst obtained in Preparation Example 1 to be placed upstream and allowing a waveform metal honeycomb catalyst commercially available from Engelhard Corp. as a CO/VOC removal catalyst to be placed downstream.

The system of Example 3 thus prepared was subjected to a reaction rate evaluation test under initial conditions described below, wherein each gas concentration on the upstream side of an exhaust gas flow from kerosene combustion, close behind the exhaust gas treating catalyst, and at the final outlet of the system was measured with an FID gas chromatograph manufactured by Shimadzu Corp. The results are shown in Table 3.

Linear flow rate: 2.5 Nm/s, CO: 63 ppm, $C_3H_8$: 13 ppm, $C_2H_4$: 13 ppm, $O_2$: 15%, $CO_2$, $H_2O$, and $N_2$: uncontrolled, GHSV of catalyst for exhaust gas treatment: 7,500 $h^{-1}$, GHSV of catalyst for CO/VOC removal: 59,000 $h^{-1}$, operation temperature: 200° C., 250° C., 300° C., 350° C., and 400° C.

Comparative Example 1

A waveform metal honeycomb catalyst commercially available from Engelhard Corp. was used alone as a CO/VOC removal catalyst without the use of the exhaust gas treating catalyst and subjected to a reaction rate evaluation test under initial conditions described below, wherein each gas concentration on the upstream side of an exhaust gas flow from kerosene combustion and close behind the CO/VOC removal catalyst was measured with an analyzer (FID gas chromatograph manufactured by Shimadzu Corp).

Linear flow rate: 2.5 Nm/s, CO: 63 ppm, $C_3H_8$: 13 ppm, $C_2H_4$: 13 ppm, $O_2$: 15%, $CO_2$, $H_2O$, and $N_2$: uncontrolled, GHSV of catalyst for CO/VOC removal: 59,000 $h^{-1}$, operation temperature: 400° C. and 500° C. The results are shown in Table 3.

TABLE 3

| | Catalyst for exhaust gas treatment (% by weight) | Catalyst for CO/VOC removal | Temperature (° C.) | Reaction rate in zone of catalyst for exhaust gas treatment (ppm) | | | | | Total reaction rate (%) | | | | |
|---|---|---|---|---|---|---|---|---|---|---|---|---|---|
| | | | | CO | $CH_4$ | $C_2H_6$ | $C_3H_8$ | $C_4H_{10}$ | CO | $CH_4$ | $C_2H_6$ | $C_3H_8$ | $C_4H_{10}$ |
| Ex. 3 | TiO2(80) | Commercially | 400 | — | 0.8 | 18.5 | 65.4 | 84.2 | 99.9 | — | — | 67.8 | — |
| | V2O5(3) | available catalyst | 350 | — | 0.0 | 12.3 | 42.3 | 78.9 | 99.8 | — | — | 44 | — |
| | WO3(8) | | 300 | — | 0.0 | 7.7 | 23.1 | 63.2 | 99.3 | — | — | 23.1 | — |
| | | | 250 | — | 0.0 | 4.6 | 11.5 | 36.8 | 97.6 | — | — | 11.5 | — |
| | | | 200 | — | 0.0 | 1.5 | 7.7 | 10.5 | 93.5 | — | — | 7.7 | — |
| Com. Ex. 1 | None | Commercially | 500 | — | — | — | — | — | 100 | — | — | 57 | — |
| | | available catalyst | 400 | — | — | — | — | — | 99.9 | — | — | 10 | — |

Example 3

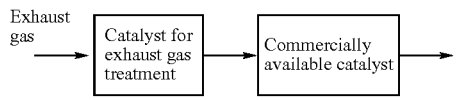

Comparative Example 1

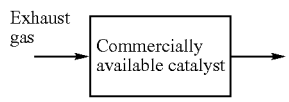

Table 3 demonstrated that Comparative Example 1, which lacks the exhaust gas treating catalyst, requires increasing the temperature of the zone of the CO/VOC removal catalyst to higher than 500° C. for attaining the same reaction rate of VOC as that at 400° C. in Example 3.

Example 4

A two-stage exhaust gas treatment system of the present invention was obtained by allowing the $TiO_2$—$V_2O_5$—$WO_3$ catalyst ($TiO_2$:$V_2O_5$:$WO_3$=80:3:8 by weight) obtained in Preparation Example 1 as an exhaust gas treating catalyst to be placed upstream and allowing the CO/VOC removal catalyst obtained in Preparation Example 3 to be placed downstream of the exhaust gas treating catalyst.

Comparative Example 2

A two-stage exhaust gas treatment system for comparison was obtained by allowing the CO/VOC removal catalyst obtained in Preparation Example 3 to be placed on the upstream side of an exhaust gas flow and allowing the exhaust gas treating catalyst obtained in Preparation Example 1 to be placed downstream.

The systems of Example 4 and Comparative Example 2 thus prepared were subjected to a reaction rate evaluation test under initial conditions described below, wherein each gas concentration on the upstream side of an exhaust gas flow from kerosene combustion, close behind the exhaust gas treating catalyst, and at the final outlet of the system was measured with each analyzer. The results are shown in Table 5.

CO, $C_3H_8$, and $C_2H_4$ concentrations: FID gas chromatograph manufactured by Shimadzu Corp.

NOx concentration: NOx analyzer ECL-77A manufactured by Yanaco $NH_3$ concentration: absorption method using dilute sulfuric acid and ion chromatograph Linear flow rate: 2.5 Nm/s, CO: 63 ppm, $C_2H_4$: 13 ppm, $C_3H_8$: 13 ppm, NOx: 63 ppm, $NH_3$: 56.7 ppm, $O_2$: 15%, $CO_2$, $H_2O$, and $N_2$: uncontrolled, GHSV of catalyst for exhaust gas treatment: 7,500 $h^{-1}$, GHSV of catalyst for CO/VOC removal: 59,000 $h^{-1}$, operation temperature: 200° C., 250° C., 300° C., 350° C., and 400° C.

Example 5

A three-stage exhaust gas treatment system of the present invention was obtained by allowing the exhaust gas treating catalyst obtained in Preparation Example 1, the CO/VOC removal catalyst obtained in Preparation Example 3, and the exhaust gas treating catalyst obtained in Preparation Example 1 as secondary reductive denitration means to be placed in this order from the upstream side of a gas flow.

The system of Example 5 thus prepared was subjected to a reaction rate evaluation test under initial conditions described below, wherein gas concentrations on the upstream side of an exhaust gas flow from kerosene combustion, close behind the exhaust gas treating catalyst, and at the final outlet of the system were measured with each analyzer. The results are shown in Table 6.

CO, $C_3H_8$, and $C_2H_4$ concentrations: FID gas chromatograph manufactured by Shimadzu Corp.

NOx concentration: NOx analyzer ECL-77A manufactured by Yanaco $NH_3$ concentration: absorption method using dilute sulfuric acid and ion chromatograph Linear flow rate: 2.5 Nm/s, CO: 63 ppm, $C_2H_4$: 13 ppm, $C_3H_8$: 13 ppm, NOx: 63 ppm, $NH_3$: 66.2 ppm, $O_2$: 15%, $CO_2$, $H_2O$, and $N_2$: uncontrolled, GHSV of catalyst for exhaust gas treatment: 7,500 $h^{-1}$, GHSV of catalyst for CO/VOC removal: 59,000 $h^{-1}$, GHSV of the secondary reductive denitration means: 59,000 $h^{-1}$, operation temperature: 200° C., 250° C., 300° C., 350° C., and 400° C.

Example 6

A two-stage exhaust gas treatment system of the present invention was obtained by allowing the $TiO_2$—$V_2O_5$—$WO_3$ catalyst ($TiO_2$:$V_2O_5$:$WO_3$=80:3:8 by weight) prepared in Preparation Example 1 as an exhaust gas treating catalyst to be placed upstream and the CO/VOC removal catalyst obtained in Preparation Example 4 to be placed downstream of the exhaust gas treating catalyst.

Example 7

A two-stage exhaust gas treatment system of the present invention was obtained by allowing the $TiO_2$—$V_2O_5$—$WO_3$ catalyst ($TiO_2$:$V_2O_5$:$WO_3$=80:3:8 by weight) prepared in Preparation Example 1 as an exhaust gas treating catalyst to be placed upstream and the catalyst obtained in Preparation Example 5 to be placed downstream of the exhaust gas treating catalyst.

Example 8

A two-stage exhaust gas treatment system of the present invention was obtained by allowing the $TiO_2$—$WO_3$ catalyst ($TiO_2$:$WO_3$=75:20 by weight) obtained in Preparation Example 2 as an exhaust gas treating catalyst to be placed upstream and the CO/VOC removal catalyst obtained in Preparation Example 5 to be placed downstream of the exhaust gas treating catalyst.

Comparative Example 3

A two-stage exhaust gas treatment system for comparison was obtained by allowing a CO/VOC removal catalyst obtained in the same way as in Example 6 to be placed on the upstream side of an exhaust gas flow and the same catalyst for exhaust gas treatment as in Example 1 to be placed downstream.

Each catalyst specification of the systems of Examples 4 to 8 and Comparative Examples 2 to 3 thus prepared is shown in Table 4. Moreover, the systems were subjected to a reaction rate evaluation test under initial conditions described below, wherein each gas concentration on the upstream side of an exhaust gas flow from kerosene combustion, close behind the exhaust gas treating catalyst, and at the final outlet of the system was measured with each analyzer. The results are shown in Tables 5 to 9.

CO, $C_3H_8$, and $C_2H_4$ concentrations: FID gas chromatograph manufactured by Shimadzu Corp.

NOx concentration: NOx analyzer ECL-77A manufactured by Yanaco $NH_3$ concentration: absorption method using dilute sulfuric acid and ion chromatograph Linear flow rate: 2.5 Nm/s, CO: 63 ppm, $C_2H_4$: 13 ppm, $C_3H_8$: 13 ppm, NOx: 63 ppm, $NH_3$: 56.7 ppm, $O_2$: 15%, $CO_2$, $H_2O$, and $N_2$: uncontrolled, GHSV of catalyst for exhaust gas treatment: 7,500 $h^{-1}$, GHSV of catalyst for CO/VOC removal: 59,000 $h^{-1}$, operation temperature: 200° C., 250° C., 300° C., 350° C., and 400° C.

TABLE 4

| | Catalyst for exhaust gas treatment (% by weight) | Catalyst for CO/VOC removal | | | | | |
|---|---|---|---|---|---|---|---|
| | | Substrate | Carrier (porous inorganic oxide) | BET specific surface ($m^3/g$) | Amount of coating on substrate ($g/m^2$) | Coating layer thickness ($\mu m$) | Active component |
| Ex. 4 | TiO2(80) V2O5(3) WO3(8) | Cordierite honeycomb | $\gamma$-Al$_2$O$_3$ | 113 | 42.5-57.5 | 30-80 | Pt |
| Ex. 5 | TiO2(80) V2O5(3) WO3(8) | Cordierite honeycomb | $\gamma$-Al$_2$O$_3$ | 113 | 42.5-57.5 | 30-80 | Pt |
| Ex. 6 | TiO2(80) V2O5(3) WO3(8) | TiO$_2$ solid honeycomb | $\gamma$-Al$_2$O$_3$ | 113 | 8.5-11.5 | 4-20 | Pt |
| Ex. 7 | TiO2(80) V2O5(3) WO3(8) | TiO$_2$ solid honeycomb | $\gamma$-Al$_2$O$_3$ | 113 | 11.9-16.1 | 6-30 | Pt |
| Ex. 8 | TiO2(75) WO3(20) | TiO$_2$ solid honeycomb | $\gamma$-Al$_2$O$_3$ | 113 | 11.9-16.1 | 6-30 | Pt |
| Com. Ex. 2 | TiO2(80) V2O5(3) WO3(8) | Cordiente honeycomb | $\gamma$-Al$_2$O$_3$ | 113 | 42.5-57.5 | 30-80 | Pt |
| Com. Ex. 3 | TiO2(80) V2O5(3) WO3(8) | TiO$_2$ solid honeycomb | $\gamma$-Al$_2$O$_3$ | 113 | 8.5-11.5 | 4-20 | Pt |

| | Catalyst for CO/VOC removal | | | |
|---|---|---|---|---|
| | Amount of active component (g/L) | Size of active component (nm) | NMHC oxidation catalyst component in coating material (% by weight) | Secondary reductive denitration means (% by weight) |
| Ex. 4 | 0.43-0.58 | 11 | — | — |
| Ex. 5 | 0.43-0.59 | 11 | — | TiO2(80) V2O5(3) WO3(8) |
| Ex. 6 | 0.39-0.53 | 11 | — | — |
| Ex. 7 | 0.39-0.53 | 11 | TiO2(24) V2O5(0.9) WO3(2.4) | — |
| Ex. 8 | 0.39-0.53 | 11 | TiO2(22) WO3(6) | — |
| Com. Ex. 2 | 0.43-0.59 | 11 | | — |
| Com. Ex. 3 | 0.39-0.53 | 11 | — | — |

Examples 4 and 6 to 8

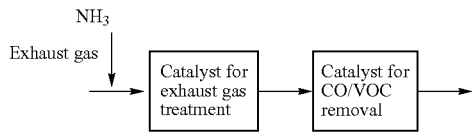

Example 5

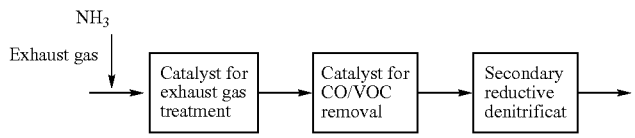

Comparative Examples 2 and 3

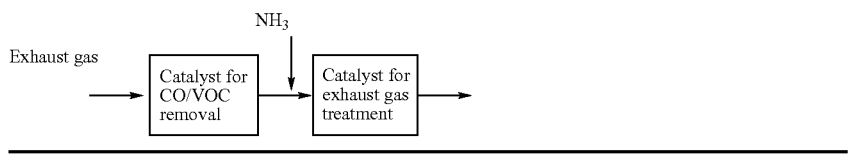

TABLE 5

| Catalyst for exhaust gas treatment (% by weight) | Catalyst for CO/VOC removal | | Temperature (° C.) | Reaction rate in zone of catalyst for exhaust gas treatment (for Comparative Example, zone of catalyst for CO/VOC removal) (%) | | | | Total reaction rate (%) | | | |
|---|---|---|---|---|---|---|---|---|---|---|---|
| | Substrate | Carrier (porous inorganic oxide) | | CO | $C_2H_4$ | $C_3H_8$ | $NO_x$ | CO | $C_2H_4$ | $C_3H_8$ | $NO_x$ |
| Ex. 4 TiO2(80) V2O5(3) WO3(8) | Cordierite honeycomb | $\gamma$-$Al_2O_3$ | 400 | 0 | — | 65.4 | 90 | 100 | 100 | 71.0 | 90 |
| | | | 350 | 0 | — | 42.3 | 90 | 100 | 100 | 47.7 | 90 |
| | | | 300 | 0 | — | 23.1 | 90 | 100 | 100 | 26.9 | 90 |
| | | | 250 | 0 | — | 11.5 | 89.9 | 99.9 | 99.5 | 13.4 | 89.9 |
| | | | 200 | 0 | — | 7.7 | 89 | 99.9 | 99 | 8.4 | 89 |
| Com. Ex. 2 TiO2(80) V2O5(3) WO3(8) | Cordierite honeycomb | $\gamma$-$Al_2O_3$ | 400 | 100 | 99.0 | 16.1 | — | 66.0 | 100 | 71.0 | 90 |
| | | | 350 | 100 | 98.8 | 9.4 | — | 76.2 | 100 | 47.7 | 90 |
| | | | 300 | 100 | 98.5 | 4.9 | — | 86.4 | 100 | 26.9 | 90 |
| | | | 250 | 99.9 | 98.1 | 2.1 | — | 92.9 | 99.5 | 13.4 | 89.9 |
| | | | 200 | 99.9 | 97.6 | 0.7 | — | 95.1 | 99.0 | 8.4 | 89 |

Example 4

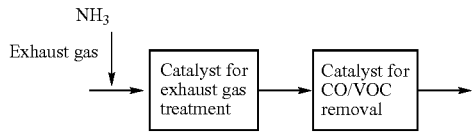

Comparative Example 2

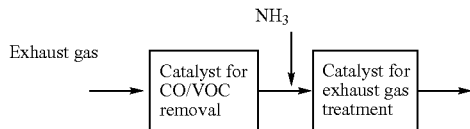

TABLE 6

| Catalyst for exhaust gas treatment (% by weight) | Catalyst for CO/VOC removal | | Temperature (° C.) | Reaction rate in zone of catalyst for exhaust gas treatment (for Comparative Example, zone of catalyst for CO/VOC removal) (%) | | | | Total reaction rate (for Example 5, reaction rate to secondary reductive denitration means) (%) | | | |
|---|---|---|---|---|---|---|---|---|---|---|---|
| | Substrate | Carrier (porous inorganic oxide) | | CO | $C_2H_4$ | $C_3H_8$ | $NO_x$ | CO | $C_2H_4$ | $C_3H_8$ | $NO_x$ |
| Ex. 5 TiO2(80) V2O5(3) WO3(8) | Cordierite honeycomb | $\gamma$-$Al_2O_3$ | 400 | 0 | — | 65.4 | 100 | 98.4 | 100 | 73.5 | 99.5 |
| | | | 350 | 0 | — | 42.3 | 100 | 98.5 | 100 | 50.1 | 99.9 |
| | | | 300 | 0 | — | 23.1 | 99.9 | 99.0 | 100 | 28.5 | 99.9 |
| | | | 250 | 0 | — | 11.5 | 99.2 | 99.5 | 99.9 | 14.2 | 99.2 |
| | | | 200 | 0 | — | 7.7 | 94.7 | 99.6 | 99.9 | 9.0 | 94.7 |
| Com. Ex. 2 TiO2(80) V2O5(3) WO3(8) | Cordierite honeycomb | $\gamma$-$Al_2O_3$ | 400 | 100 | 99.0 | 16.1 | — | 66.0 | 100 | 71.0 | 100 |
| | | | 350 | 100 | 98.8 | 9.4 | — | 76.2 | 100 | 47.7 | 100 |
| | | | 300 | 100 | 98.5 | 4.9 | — | 88.4 | 100 | 26.9 | 99.9 |
| | | | 250 | 99.9 | 98.1 | 2.1 | — | 92.9 | 99.9 | 13.4 | 99.2 |
| | | | 200 | 99.9 | 97.6 | 0.7 | — | 95.1 | 99.9 | 8.4 | 94.7 |

Example 5

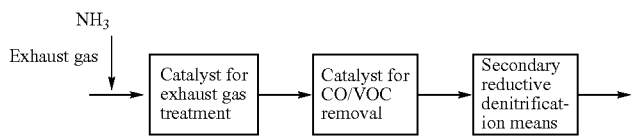

TABLE 6-continued

| | | Catalyst for CO/VOC removal | | Reaction rate in zone of catalyst for exhaust gas treatment (for Comparative Example, zone of catalyst for CO/VOC removal) (%) | | | | Total reaction rate (for Example 5, reaction rate to secondary reductive denitration means) (%) | | | |
|---|---|---|---|---|---|---|---|---|---|---|---|
| Catalyst for exhaust gas treatment (% by weight) | Substrate | Carrier (porous inorganic oxide) | Temperature (° C.) | CO | $C_2H_4$ | $C_3H_8$ | $NO_x$ | CO | $C_2H_4$ | $C_3H_8$ | $NO_x$ |

Comparative Example 2

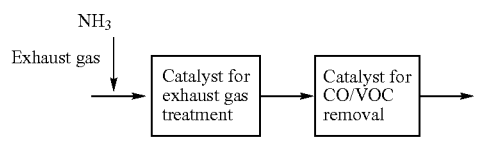

TABLE 7

| | Catalyst for exhaust gas treatment (% by weight) | Catalyst for CO/VOC removal | | | Reaction rate in zone of catalyst for exhaust gas treatment (for Comparative Example, zone of catalyst for CO/VOC removal) (%) | | | | Total reaction rate (%) | | | |
|---|---|---|---|---|---|---|---|---|---|---|---|---|
| | | Substrate | Carrier (porous inorganic oxide) | Temperature (° C.) | CO | $C_2H_4$ | $C_3H_8$ | $NO_x$ | CO | $C_2H_4$ | $C_3H_8$ | $NO_x$ |
| Ex. 6 | TiO2(80) V2O5(3) WO3(8) | TiO$_2$ solid honeycomb | γ-Al$_2$O$_3$ | 400 | 0 | — | 65.4 | 90 | 100 | 100 | 75.2 | 90 |
| | | | | 350 | 0 | — | 42.3 | 90 | 100 | 100 | 46.6 | 90 |
| | | | | 300 | 0 | — | 23.1 | 90 | 100 | 99.1 | 24.1 | 90 |
| | | | | 250 | 0 | — | 11.5 | 89.9 | 99.5 | 90.1 | 11.7 | 89.9 |
| | | | | 200 | 0 | — | 7.7 | 89 | 99.2 | 72.3 | 7.7 | 89 |
| Com. Ex. 3 | TiO2(80) V2O5(3) WO3(8) | TiO$_2$ solid honeycomb | γ-Al$_2$O$_3$ | 400 | 100 | 98.9 | 28.4 | — | 70.9 | 100 | 75.2 | 90 |
| | | | | 350 | 100 | 98.2 | 7.4 | — | 75.6 | 100 | 46.6 | 90 |
| | | | | 300 | 100 | 96.8 | 1.3 | — | 85.6 | 99 | 24.1 | 90 |
| | | | | 250 | 99.5 | 85.3 | 0.2 | — | 92.4 | 90.1 | 11.7 | 89.9 |
| | | | | 200 | 99.2 | 61.1 | 0.0 | — | 94.4 | 72.3 | 7.7 | 89 |

Example 6

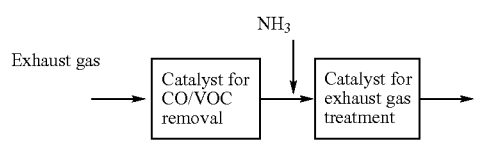

Comparative Example 3

TABLE 8

| Catalyst for exhaust gas treatment (% by weight) | Catalyst for CO/VOC removal | | Temperature (°C.) | Reaction rate in zone of catalyst for exhaust gas treatment (for Comparative Example, zone of catalyst for CO/VOC removal) (%) | | | | Total reaction rate (%) | | | |
|---|---|---|---|---|---|---|---|---|---|---|---|
| | Substrate | Carrier (porous inorganic oxide) | | CO | $C_2H_4$ | $C_3H_8$ | $NO_x$ | CO | $C_2H_4$ | $C_3H_8$ | $NO_x$ |
| Ex. 7 TiO2(80) V2O5(3) WO3(8) | $TiO_2$ solid honeycomb | $\gamma$-$Al_2O_3$ | 400 | 0 | — | 65.4 | 90 | 100 | 100 | 75.2 | 90 |
| | | | 350 | 0 | — | 42.3 | 90 | 100 | 100 | 46.6 | 90 |
| | | | 300 | 0 | — | 23.1 | 90 | 100 | 99.3 | 24.1 | 90 |
| | | | 250 | 0 | — | 11.5 | 89.9 | 99.5 | 92.1 | 11.7 | 89.9 |
| | | | 200 | 0 | — | 7.7 | 89 | 99.2 | 74.5 | 7.7 | 89 |
| Com. Ex. 3 TiO2(80) V2O5(3) WO3(8) | $TiO_2$ solid honeycomb | $\gamma$-$Al_2O_3$ | 400 | 100 | 99.2 | 28.4 | — | 70.9 | 100 | 75.2 | 90 |
| | | | 350 | 100 | 98.4 | 7.4 | — | 75.6 | 100 | 46.6 | 90 |
| | | | 300 | 100 | 96.6 | 1.3 | — | 85.6 | 99 | 24.1 | 90 |
| | | | 250 | 99.5 | 86.8 | 0.2 | — | 92.3 | 92.1 | 11.7 | 89.9 |
| | | | 200 | 98.9 | 66.3 | 0.0 | — | 94.2 | 74.5 | 7.7 | 89 |

Example 7

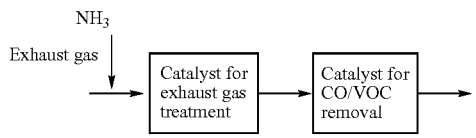

Comparative Example 3

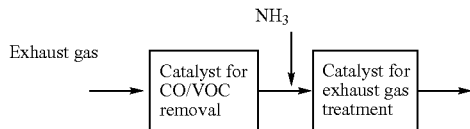

TABLE 9

| Catalyst for exhaust gas treatment (% by weight) | Catalyst for CO/VOC removal | | Temperature (°C.) | Reaction rate in zone of catalyst for exhaust gas treatment (for Comparative Example, zone of catalyst for CO/VOC removal) (%) | | | | Total reaction rate (%) | | | |
|---|---|---|---|---|---|---|---|---|---|---|---|
| | Substrate | Carrier (porous inorganic oxide) | | CO | $C_2H_4$ | $C_3H_8$ | $NO_x$ | CO | $C_2H_4$ | $C_3H_8$ | $NO_x$ |
| Ex. 7 TiO2(80) V2O5(3) WO3(8) | $TiO_2$ solid honeycomb | $\gamma$-$Al_2O_3$ | 400 | 0 | — | 65.4 | 90 | 100 | 100 | 75.1 | 90 |
| | | | 350 | 0 | — | 42.3 | 90 | 100 | 100 | 46.5 | 90 |
| | | | 300 | 0 | — | 231 | 90 | 100 | 99.3 | 24.1 | 90 |
| | | | 250 | 0 | — | 11.5 | 89.9 | 99.5 | 90.6 | 11.7 | 89.9 |
| | | | 200 | 0 | — | 7.7 | 89 | 99.2 | 73.3 | 7.7 | 89 |
| Com. Ex. 3 TiO2(80) V2O5(3) WO3(8) | $TiO_2$ solid honeycomb | $\gamma$-$Al_2O_3$ | 400 | 100 | 99.1 | 28.2 | — | 70.8 | 100 | 75.1 | 90 |
| | | | 350 | 100 | 98.3 | 7.3 | — | 75.6 | 100 | 46.5 | 90 |
| | | | 300 | 100 | 96.4 | 1.3 | — | 85.6 | 99 | 24.1 | 90 |
| | | | 250 | 99.5 | 85.8 | 0.2 | — | 92.3 | 90.6 | 11.7 | 89.9 |
| | | | 200 | 98.9 | 62.2 | 0.0 | — | 94.2 | 73.3 | 7.7 | 89 |

Example 8

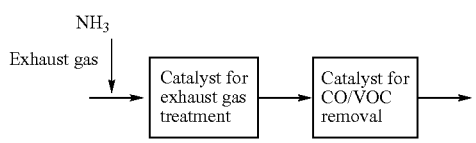

TABLE 9-continued

| Catalyst for exhaust gas treatment (% by weight) | Catalyst for CO/VOC removal | | Temperature (° C.) | Reaction rate in zone of catalyst for exhaust gas treatment (for Comparative Example, zone of catalyst for CO/VOC removal) (%) | | | | Total reaction rate (%) | | | |
|---|---|---|---|---|---|---|---|---|---|---|---|
| | Substrate | Carrier (porous inorganic oxide) | | CO | $C_2H_4$ | $C_3H_8$ | $NO_x$ | CO | $C_2H_4$ | $C_3H_8$ | $NO_x$ |

Comparative Example 3

Exhaust gas → [Catalyst for CO/VOC removal] →(NH₃)→ [Catalyst for exhaust gas treatment] →

Tables 3 and 5 to 9 demonstrated that Examples 3 to 8 wherein the zone of the exhaust gas treating catalyst was placed upstream the zone of the CO/VOC removal catalyst improved the total reaction rate of CO at all the temperatures from 200 to 400° C., as compared with Comparative Examples 2 and 3 wherein the zone of the exhaust gas treating catalyst was placed downstream the zone of the CO/VOC removal catalyst.

What is claimed is:

1. A treatment system of an exhaust gas containing CO and VOC, comprising:
   an exhaust gas treatment means for partially oxidizing the VOC to CO; and
   a CO/VOC removing means for oxidizing the CO and partially unreacted VOC,
   in this order from an upstream flow of the exhaust gas;
   wherein the exhaust gas treatment means comprises an exhaust gas treating catalyst comprising 60% by weight or more $TiO_2$, 3 to 8% by weight $V_2O_5$, and 3 to 20% by weight $WO_3$ with respect to the total weight of the catalyst, and the exhaust gas treating catalyst does not include a noble metal.

2. The exhaust gas treatment system of claim 1, wherein the CO/VOC removing means comprises a CO/VOC removing catalyst comprising a honeycomb substrate and a porous inorganic compound layer thereon comprising a noble metal wherein the substrate comprises a porous inorganic compound unreactive to the nitrogen oxide, CO, and VOC, while the layer has reactivity to the CO and VOC.

3. The exhaust gas treatment system of claim 2, wherein the porous inorganic compound layer has a thickness of 4 μm to 80 μm.

4. The exhaust gas treatment system of claim 2, wherein the noble metal comprises Pt having an average particle size of 1 to 15 nm.

5. The exhaust gas treatment system of claim 2, wherein the porous inorganic compound layer has a BET specific surface of 50 m²/g or more and holds the noble metal within 50 μm deep from a top surface thereof.

6. The exhaust gas treatment system of claim 1, wherein the CO/VOC removing means comprises a CO/VOC removing catalyst comprising a honeycomb substrate and a porous inorganic compound layer thereon, wherein the substrate comprises a an NMHC oxidation catalyst and the layer comprises a noble metal.

7. The exhaust gas treatment system of claim 6, wherein the porous inorganic compound layer has a thickness of 4 μm to 80 μm.

8. The exhaust gas treatment system of claim 6, wherein the noble metal comprises Pt having an average particle size of 1 to 15 nm.

9. The exhaust gas treatment system of claim 6, wherein the porous inorganic compound layer has a BET specific surface of 50 m²/g or more and holds the noble metal within 50 μm deep from a top surface thereof.

10. The exhaust gas treatment system of claim 1, wherein the CO/VOC removing means comprises a CO/VOC removing catalyst comprising a honeycomb substrate and a porous inorganic compound layer thereon, wherein the substrate comprises an NMHC oxidation catalyst and the layer comprises a noble metal and an NMHC oxidation catalyst.

11. The exhaust gas treatment system of claim 10, wherein the porous inorganic compound layer has a thickness of 4 μm to 80 μm.

12. The exhaust gas treatment system of claim 10, wherein the noble metal comprises Pt having an average particle size of 1 to 15 nm.

13. The exhaust gas treatment system of claim 10, wherein the porous inorganic compound layer has a BET specific surface of 50 m²/g or more and holds the noble metal within 50 μm deep from a top surface thereof.

14. A treatment system of an exhaust gas containing a nitrogen oxide, CO and VOC, comprising:
    an exhaust gas treatment means for removing the nitrogen oxide by reduction thereof with ammonia and partially oxidizing the VOC to CO, and
    a CO/VOC removing means for oxidizing the CO and partially unreacted VOC,
    in this order from an upstream flow of the exhaust gas;
    wherein the exhaust gas treatment means comprises an exhaust gas treating catalyst comprising 60% by weight or more $TiO_2$, 3 to 8% by weight $V_2O_5$, and 3 to 20% by weight $WO_3$ with respect to the total weight of the catalyst; and
    wherein the CO/VOC removing means comprises a CO/VOC removing catalyst comprising a honeycomb substrate and a porous inorganic compound layer thereon comprising a noble metal wherein the substrate comprises a porous inorganic compound unreactive to the nitrogen oxide, CO, and VOC, while the layer has reactivity to the CO and VOC, and
    wherein the treatment system further comprises a secondary reductive denitration means downstream of the CO/VOC removing means.

15. A treatment system of an exhaust gas containing a nitrogen oxide, CO and VOC, comprising:

an exhaust gas treatment means for removing the nitrogen oxide by reduction thereof with ammonia and partially oxidizing the VOC to CO, and a CO/VOC removing means for oxidizing the CO and partially unreacted VOC, in this order from an upstream flow of the exhaust gas;

wherein the exhaust gas treatment means comprises an exhaust gas treating catalyst comprising 60% by weight or more $TiO_2$, 3 to 8% by weight $V_2O_5$, and 3 to 20% by weight $WO_3$ with respect to the total weight of the catalyst; and wherein the CO/VOC removing means comprises a CO/VOC removing catalyst comprising a honeycomb substrate and a porous inorganic compound layer thereon, wherein the substrate comprises an NMHC oxidation catalyst and the layer comprises a noble metal, and wherein the treatment system further comprises a secondary reductive denitration means downstream of the CO/VOC removing means.

16. A treatment system of an exhaust gas containing a nitrogen oxide, CO and VOC, comprising:

an exhaust gas treatment means for removing the nitrogen oxide by reduction thereof with ammonia and partially oxidizing the VOC to CO, and a CO/VOC removing means for oxidizing the CO and partially unreacted VOC, in this order from an upstream flow of the exhaust gas;

wherein the exhaust gas treatment means comprises an exhaust gas treating catalyst comprising 60% by weight or more $TiO_2$, 3 to 8% by weight $V_2O_5$, and 3 to 20% by weight $WO_3$ with respect to the total weight of the catalyst; and wherein the CO/VOC removing means comprises a CO/VOC removing catalyst comprising a honeycomb substrate and a porous inorganic compound layer thereon, wherein the substrate comprises an NMHC oxidation catalyst and the layer comprises a noble metal and an NMHC oxidation catalyst, and wherein the treatment system further comprises a secondary reductive denitration means downstream of the CO/VOC removing means.

* * * * *